United States Patent [19]

Torterotot et al.

[11] 4,160,852
[45] Jul. 10, 1979

[54] PRODUCTION OF STERILE PACKAGES

[76] Inventors: Roland M. Torterotot, "Le Petit Chaillot", 78730 Rochefort-en-Yvelines; Jean R. L. Nasica, 19, avenue Emile Deschanel, 75007 Paris, both of France

[21] Appl. No.: 837,750

[22] Filed: Sep. 29, 1977

[30] Foreign Application Priority Data

Oct. 6, 1976 [FR] France .................. 76 30144
Jun. 1, 1977 [FR] France .................. 77 16772

[51] Int. Cl.² ............................ B32B 3/02
[52] U.S. Cl. ................. 428/192; 53/426; 53/167; 206/438; 206/484; 128/DIG. 24; 229/53; 229/3.5 MF; 229/3.5 R; 426/410; 428/36; 428/213; 428/214; 428/447; 428/452; 428/457; 428/537
[58] Field of Search .................. 428/192, 35, 36, 447, 428/457, 537, 315, 213, 214, 452; 229/53, 3.5 MF, 3.5 R; 206/438, 484; 426/399, 410, 412, 413, 415; 128/DIG. 24; 53/426, 167

[56] References Cited

U.S. PATENT DOCUMENTS

| | | | |
|---|---|---|---|
| 2,191,704 | 2/1940 | Bennett | 428/192 |
| 2,536,773 | 1/1951 | Saidel | 428/35 |
| 3,057,471 | 10/1962 | Stonehill | 206/438 |
| 3,455,302 | 7/1969 | Liloia | 428/192 |
| 3,578,549 | 5/1971 | Cleereman | 428/192 |
| 3,616,190 | 10/1971 | Shaw | 428/35 |
| 3,891,008 | 6/1975 | D'Entremont | 428/36 |
| 3,891,089 | 6/1975 | Goodwin | 428/192 |
| 3,903,335 | 9/1975 | Jones | 206/438 |
| 3,995,739 | 12/1976 | Tasch | 206/484 |
| 4,006,823 | 2/1977 | Soto | 229/53 |
| 4,053,671 | 10/1977 | Carlisle | 428/192 |
| 4,063,641 | 12/1977 | Kuehn | 428/35 |

FOREIGN PATENT DOCUMENTS 1393091  5/1975  United Kingdom .................. 428/35

Primary Examiner—Ellis P. Robinson
Attorney, Agent, or Firm—Brooks, Haidt, Haffner & Delahunty

[57] ABSTRACT

A composite strip for producing a sterile package comprises two superposed individual strips, the inner surfaces of which are sterile, and at least one of which comprises a thermoplastic material. The thermoplastic material is such that after the separation of the two individual strips, the individual strip comprising thermoplastic material can be sealed to a part of itself or to the other strip by welding or glueing with the application of heat and pressure. A first part of one individual strip and another part of the same strip or of the other individual strip are joined at their edges in a sealed manner to form a hollow and sealed packing.

18 Claims, 30 Drawing Figures

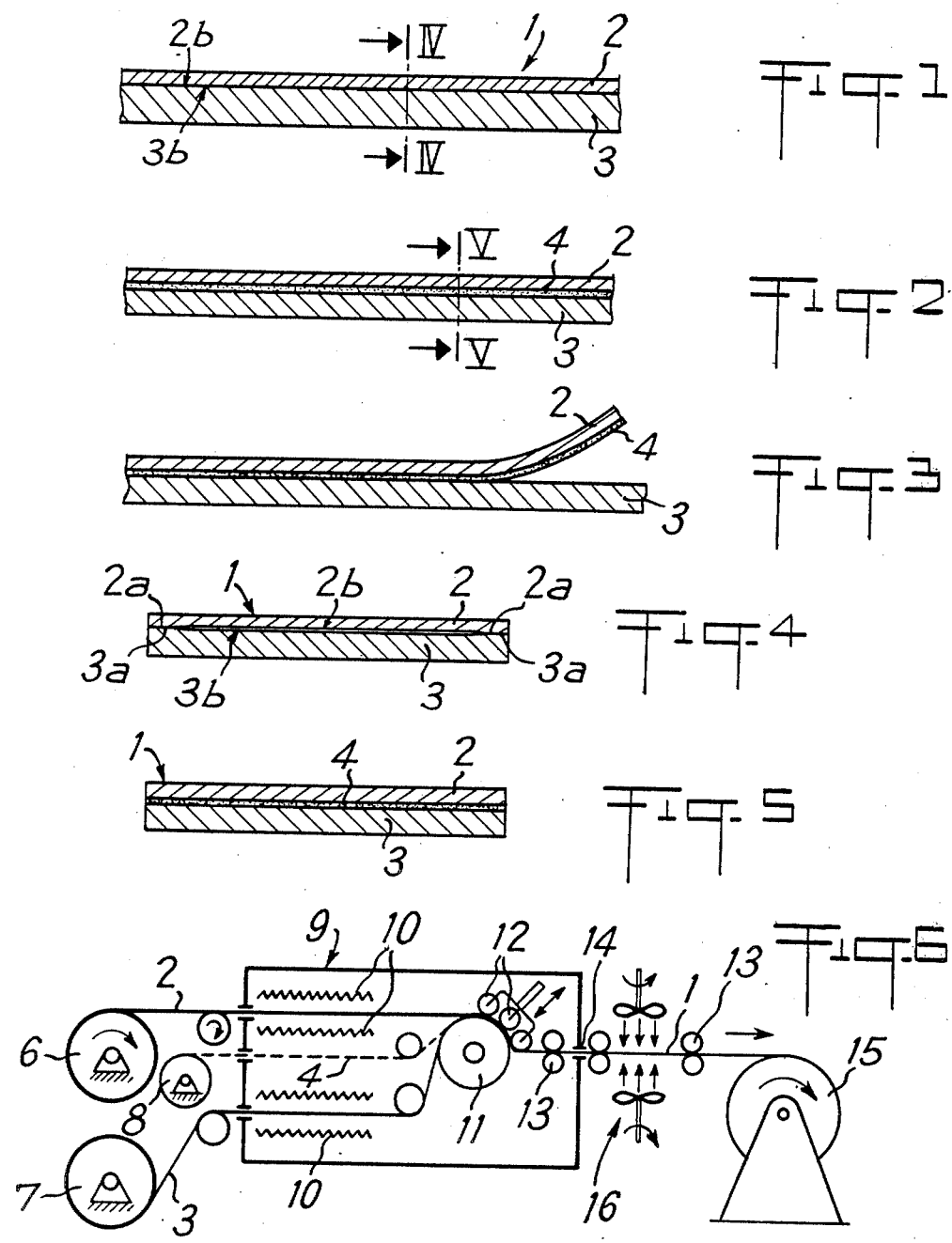

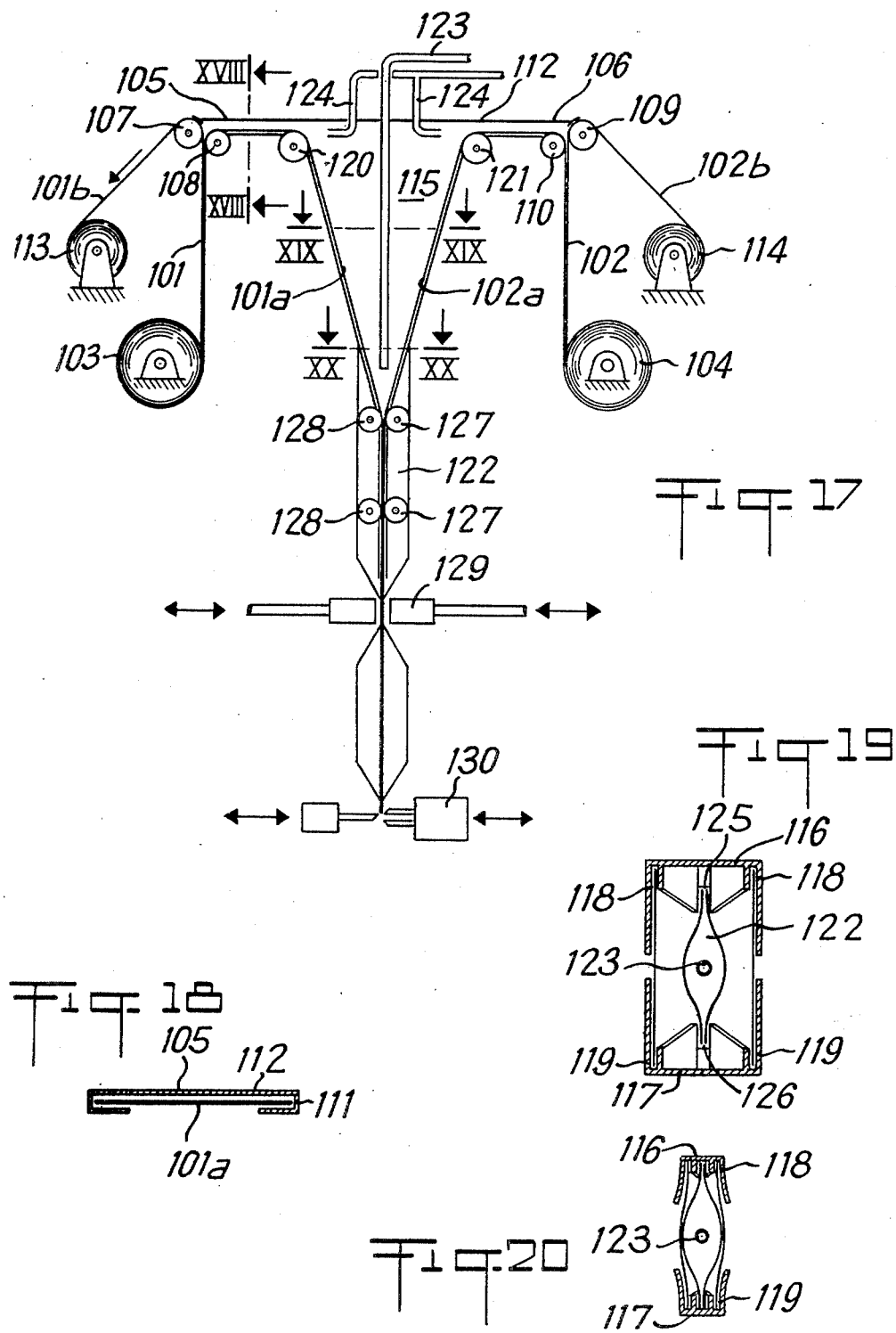

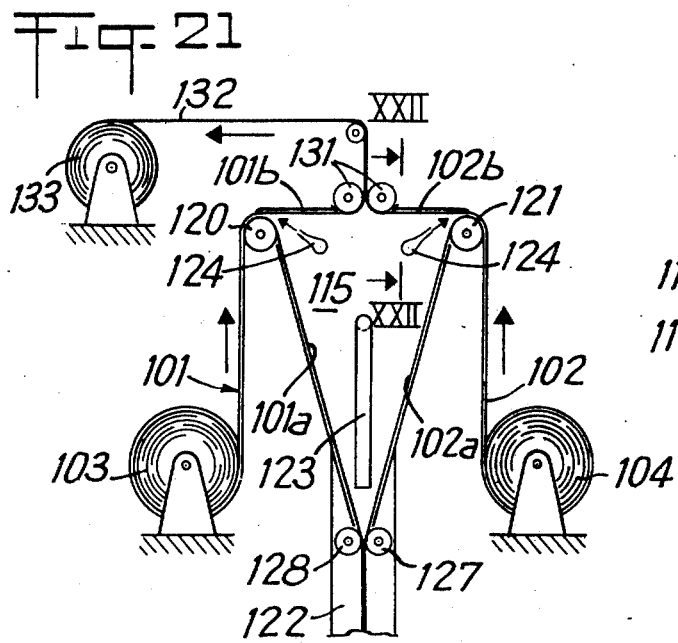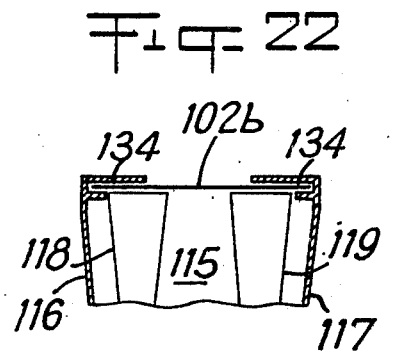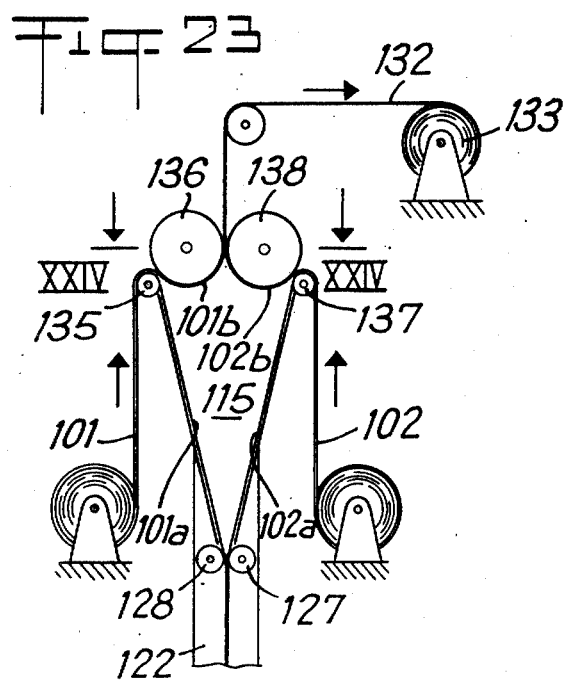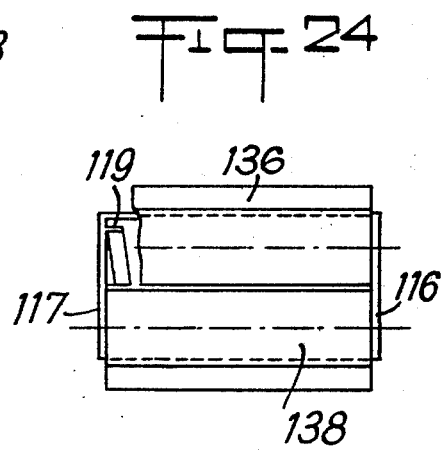

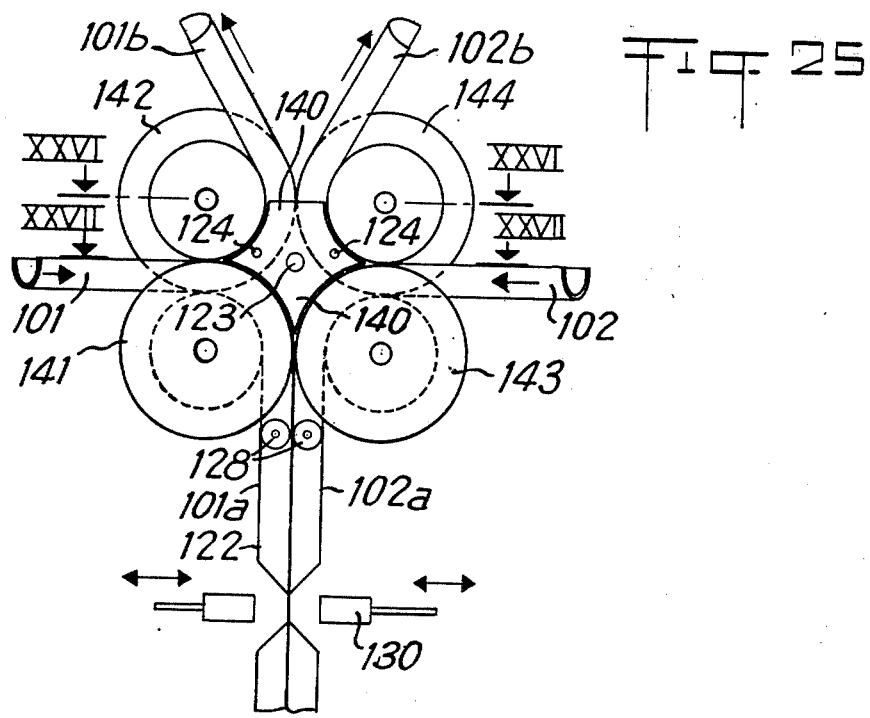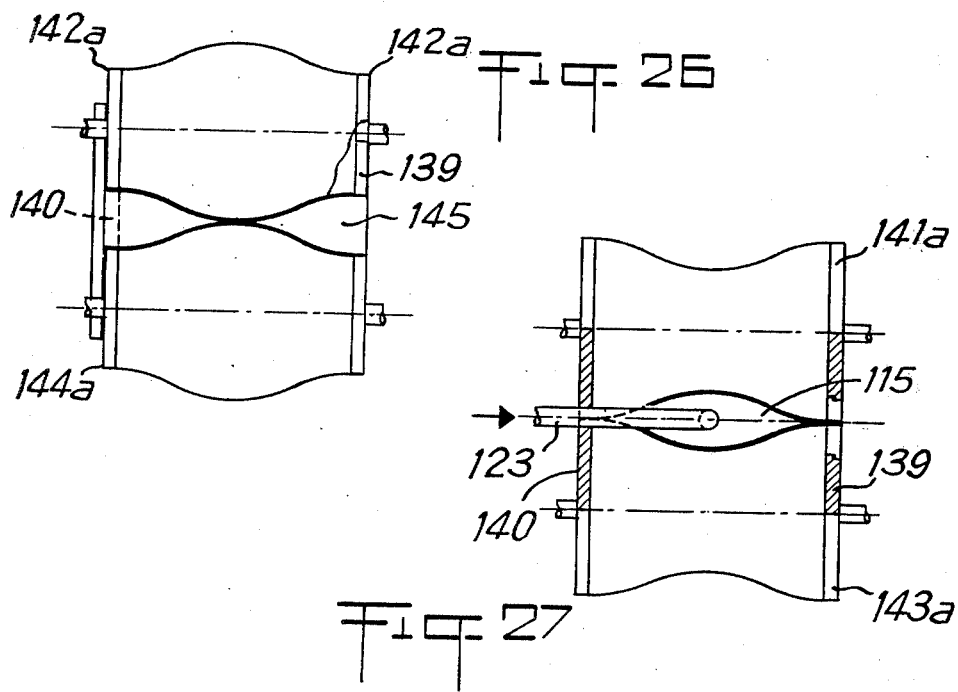

– 4,160,852 –

PRODUCTION OF STERILE PACKAGES

BACKGROUND OF THE INVENTION

1. Field of the Invention

The present invention relates to a composite strip intended for the packing of products preferably liquid and/or in paste form, and composed of at least two individual strips, one of which is made, preferably, in a material that is thermoplastic or provided with such a material and which, at least on their edges, adhere together in liquid-tight manner.

2. Description of the Prior Art

Hitherto, such composite strips for the packing of products were made by subjecting their external faces, intended to constitute subsequently the inner wall of a packing, to a sterilisation treatment in a sterile area, this being done immediately before filling the packings formed from such composite strips.

It has been found that this way of making sterile packings for products is extremely costly and complicated and requires the employment of sterilising products which, in most cases, are harmful to the ambient medium or to personnel working in the ambient medium.

SUMMARY OF THE INVENTION

According to the invention two opposed adjacent surfaces of the individual strips constituting the composite strip, are sterile and able to be separated one from the other under the action of low pulling forces applied to one and the other of the individual strips in divergent directions at a temperature in excess of 30° C., and at most equal to the softening temperature of the thermoplastic material, in that the thermoplastic material used is such that after the separation of the two individual strips the individual strip having thermoplastic material may be sealed to part of itself or to the other strip by welding or glueing, preferably with the application of heat and pressure, and in that a first portion of an individual strip and another portion of the same strip and of the other individual strip, portions which had preferably the same surfaces initially, are intended to be joined by their longitudinal edges and transversally to their longitudinal edges, in fluid tight manner, to form a hollow and fluid-tight packing whose inner wall is sterile.

In this manner it is possible to make sterile packings without the need to sterilise the inner wall of the packings, just before filling them and sealing them.

The invention relates also to a process for the manufacture of a composite strip of the above-mentioned type, said process being characterised in that, in a sterile medium, the material or materials forming the two individual strips are heated to, or kept at a sterilisation temperature for a period sufficient for their sterilisation, they are joined by thermoglueing or sealing in such a manner as to cause them to adhere one on the other in fluid-tight manner at least in their border areas.

Thus, composite strips are made with sterile inner faces which may be first made rationally in specialised workshops and which can, subsequently, be stored and transported with sterile internal faces and await without any trouble the moment of their utilisation.

The invention relates also to an application of the composite strip of the above-mentioned type to the sterile packing of preferably pasty and/or liquid products, in containers or sachets whose inner wall is sterile.

This application of the composite strip is characterised in that the composite strip is moved forward, preferably stepwise, and, possibly, it is heated to a temperature promoting the separation of the composite strip into two individual strips, the two individual strips are separated from each other in a sterile area which is partly delimited by them, the non-sterile side of each strip being situated outside the said sterile enclosure, one of the individual strips is expelled in liquid-tight manner out of the said enclosure, while the guiding is performed, in fluid-tight manner, of the longitudinal edges of the other individual strip along the rigid wall of the said enclosure and in such a manner as to bring progressively closer together the sterile faces of the longitudinal edges, thus forming a tube, preferably flattened, which, by its open end, communicates with the said sterile enclosure, the said tube is closed in liquid-tight manner by sealing the longitudinal edges one on the other as the said composite strip moves forward, the said tube with sealed longitudinal edges is sealed transversally at a place away from the input of the sterile enclosure in such a manner as to seal, in fluid-tight manner, the passage between two successive portions of the tube, the filling is performed, from the sterile enclosure, of the portion of tube which communicates with the said enclosure, with a specific amount of products during or after a new step forward of the said tube, the sealing or welding is performed, again transversally, of the said tube to the other end of the section of tube which has just been filled, in such a manner as to make tubular packing elements and, finally, if need be, the various filled sections of tubing or tubular packing elements are separated by cutting them transversally in the areas of their transversal sealings.

BRIEF DESCRIPTION OF THE DRAWINGS

The invention will now be described by way of example only with reference to the accompanying drawings, in which:

FIGS. 1 to 3 represent, in vertical longitudinal section, various methods of embodiment of the composite strip;

FIG. 4 is a vertical cross-section through the composite strip along the section line IV—IV of FIG. 1;

FIG. 5 is a vertical cross-section of the composite strip according to line V—V of FIG. 2;

FIG. 6 shows diagrammatically an installation permitting the production of the composite strip and illustrates a first method of embodiment of the process for the production of the said composite strip;

FIG. 17 shows diagrammatically a first method of construction of a sterile packing installation using two composite strips;

FIG. 18 is a cross-section along line XVIII—XVIII of FIG. 17;

FIG. 19 is a horizontal cross-section of the sterile enclosure along line XIX—XIX of FIG. 17;

FIG. 20 is a horizontal section of the sterile enclosure along line XX-XXX of FIG. 17;

FIG. 21 shows diagrammatically a vertical sterile packing installation, an installation using also two composite strips;

FIG. 22 is a vertical section of the top part of the sterile enclosure along vertical line XXII—XXII of FIG. 21;

FIG. 23 shows in diagrammatic manner a third method of construction of a sterile packing installation using also the application of the two composite strips;

FIG. 24 is a plan view of a horizontal section at the top part of the sterile enclosure along line XIV—XIV of FIG. 23;

FIG. 25 shows in elevation in diagrammatic manner a fourth method of construction of the sterile packing installation also using two composite strips;

FIG. 26 is a cross-sectional view of the top part of the sterile enclosure along line XVI—XVI of FIG. 25;

FIG. 27 is a plan view of a horizontal section of the sterile enclosure along line XVII—XVII of FIG. 25;

DESCRIPTION OF THE PREFERRED EMBODIMENTS

Figure 7:
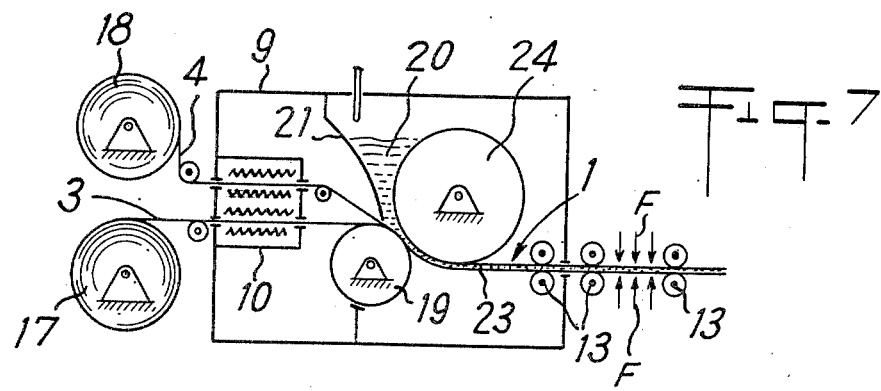
FIG. 7 shows diagrammatically an installation for the making of a composite strip according to an alternative of the manufacturing process.

Such as represented in FIG. 1, the composite strip 1 is composed of two individual strips 2 and 3 one of which is, preferably, made in a thermoplastic material or comprises a thermoplastic material incorporated into it and lends itself to any required thermoforming. These two strips 2 and 3 adhere together in fluid-tight manner, at any rate on their longitudinal edges 2a, 3a as will be see on FIG. 4. The two adjacent surfaces 2b and 3b of the individual strips 2, 3, that is to say the surfaces opposite each other of these individual strips, are sterile and are able to be pulled apart under the action of low pulling forces applied on one and the other individual strip in divergent directions. Preferably, these individual strips 2 and 3 may come apart easily at a temperature in excess of 30° C. and at most equal to the softening temperature of the thermoplastic material which constitutes, at least partly, one of the two individual strips 2 and 3. The thermoplastic material is chosen in a quality or composition such that after the separation of the two individual strips 2 and 3 the individual strip comprising the thermoplastic material, for example strip 3, may be sealed to part of itself or to the other strip, for example 2, by welding or glueing, preferably with the application of heat and pressure, i.e. heat sealing. In addition, a first portion of an individual strip, for example 3, and another portion of the same individual strip or of the other individual strip, for example 2, are intended to be connected by their edges defining the outline of the said portions, in fluid-tight manner to form a hollow and fluid-tight packing whose internal wall is sterile. In the majority of cases, the parts of the same strip or of the two individual strips 2, 3, parts which are joined together, have the same initial surface.

Moreover, it is possible to dispose a thin sterile separation layer 4 between the two individual strips 2 and 3 (see FIGS. 2, 3 and 5). The separation layer 4 may exhibit relative to one of the individual strips, for example 2, an adhesive power greater than relative to the other strip, for example 3 (see FIG. 3). The separation layer 4 may be based on silicones or on a glue, preferably of thermo-adhesive type, or again on a microcrystalline wax. Naturally, the separation layer may also extend throughout the width of the composite strip 1 (FIG. 5) or may also be situated only inside the longitudinal edges 2a, 3s of the individual strips 2, 3, in such a manner that the longitudinal edges adhere directly one on the other in liquid-tight manner.

The second individual strip, for example strip 2, may be made in a cellulosic material such as paper and/or cardboard, metal or an alloy of metals, or again in other suitable materials. It is also possible to coat the second individual strip 2 with a film of thermoplastic material or make it entirely in a thermoplastic material.

It must be observed that the two individual strips 2 and 3 may themselves be constituted by several strips superimposed in the manner of a sandwich but which, this time, are not easily pulled apart, so that they must be regarded as forming one strip only.

The nature of the thermoplastic material forming the second individual strip, for example 2, may be different from that of the thermoplastic material forming the first individual strip, for example 3. But it is also possible to make the two individual strips 2 and 3 with the same thermoplastic material. Moreover, at least one of the individual strips 2 and 3, when it is in thermoplastic material, has a thickness sufficient to be able, if need be, to be thermoformed by deep stamping. In some cases, it is of interest that the thicknesses of the two individual strips 2 and 3 should be different and that the individual strip of thermoplastic material, for example 3, intended for thermoforming by deep stamping, should have a thickness at least twice greater than that of the other individual strip. In addition, in some cases, it is of interest to make the individual thermplastic strip in an expanded material.

The manufacturing process of the composite strip must be carried out in sterile surroundings. Generally, the material or materials forming the two individual strips 2 and 3 are heated to, or kept at a sterilisation temperature for a time sufficient for their sterilisation and they are joined, again in a sterile medium, by thermoglueing or sealing, in such a manner as to make them adhere on on the other, in fluid-tight manner, at least in their marginal areas, that is to say in the area of their longitudinal edges 2a, 3a.

In FIG 6 a diagrammatic representation is given of a first method of construction of an installation permitting the production of a composite strip 1. In this case the unwinding is performed, from three storage reels 6, 7 and 8, of a first individual strip 3, a second individual strip 2 and an intermediate film 4 which are introduced one on top of the other into a sterile chamber 9 which has a certain number of heating means 10 making it possible to heat the various strips and films 2, 3 and 4 to the sterilisation temperature. In connection with the sterilisation temperature it should be observed that it has not an exact specific value and that it must be adapted to the length of the sterilisation treatment, for the important aspect for sterilisation is the product resulting from the multiplication of the treatment temperature by the length of the sterilisation treatment. When the various strips 2, 3 and 4 have undergone a sterilisation treatment sufficient to make them sterile, they are joined, still inside the sterilisation chamber 9 in sterile surroundings while they are passed together over the same roll 11, being applied with a certain force one against the other, for example by means of a train of pressing rolls 12. Then, the composite strip 1 thus produced is made to pass between supporting and drive rollers 13 through a delivery slit 14 of the sterilisation chamber 9, and it is wound over a reel 15. If need be, the composite strip 1 may undergo, on leaving the sterilisation chamber 9, a cooling treatment in a cooling station 16. Naturally, the cooling treatment must not be very intensive, for it is sufficient to cool the composite strip 1 by a few tens of degrees only for it to be sufficiently firm to withstand transport and winding. Naturally, should the starting material for the making of the composite strip 1 be an individual strip of thermoplastic material, the sterilisation temperature used does not generally exceed the softening temperature of the thermoplastic material.

According to the method of construction diagrammatically represented in FIG. 7, the operation starts from a reel 17 from which a first strip of thermoplastic material 3 is unwound which, if need be, may be of expanded material. But this first strip 3 may also be made in a light metal or an alloy of light metals. Again, from another reel 18, the intermediate film 4 is unwound and the strip 3 and the film 4 are introduced into the fluid-tight sterilisation chamber 9 and made to pass through a heating box 10. The sterilised individual strip 3 and the intermediate film 4, also sterilised, are joined, again inside the sterilisation chamber 9, on a roll 19, and there is deposited, on the intermediate film, a melted thermoplastic material 20, contained in a container 21 and provided, if need be, with a swelling agent. This thermoplastic material 20 is distributed in the form of a layer on the intermediate film 4, or on the individual strip 3, in the event of the intermediate film not being used. The adjustment is made of the thickness of the layer 23 deposited, from the thermoplastic material 20 in melted form on the intermediate film 4, with the aid of a rotating cylinder 24 by bringing it in varying degrees closer to the outline of the roll 19. It should be pointed out that the upper side of the intermediate film 4, upper side which eventually comes in contact with the layer 23 forming the second individual strip, need not be sterile as the melted thermoplastic material 20 may cause the sterilisation of said side provided it is held for a sufficient period at a temperature comprised between 80° C. and the softening temperature of the thermoplastic material.

The composite strip 1 thus produced is guided by rolls 13 outside the sterilisation chamber and may undergo a cooling treatment (see arrow f of the FIG. 7) before being wound on a reel such as 15.

The intermediate film 4 which is disposed between the two individual strips 2 and 3 may be sterilised beforehand or sterilised at the latest at the time of its introduction between the two individual strips. This intermediate film 4 may be in an adhesive material which can be unstuck, or a silicones-based material, or also any other suitable material.

When recourse is had to a sterilisation chamber 9, it is possible to use as sterile medium a sterile atmosphere containing a neutral gas or sterilised enriched oxygen.

Instead of starting from already manufactured individual strips to make a composite strip, it is possible to extrude at least one of the individual strips 2, 3 and deposit it on the other individual strip while its constituent material, thermoplastic for example, is still at a temperature close to extrusion temperature. It is also possible to extrude the intermediate film or films 4 and place it or them immediately afterwards between the two individual strips 2 and 3 which are still at sterilisation temperature.

The use of a sterile atmosphere containing a neutral gas or enriched oxygen may be avoided if the extrusion is performed of the individual strips and of the intermediate film as follows.

Figure 8:
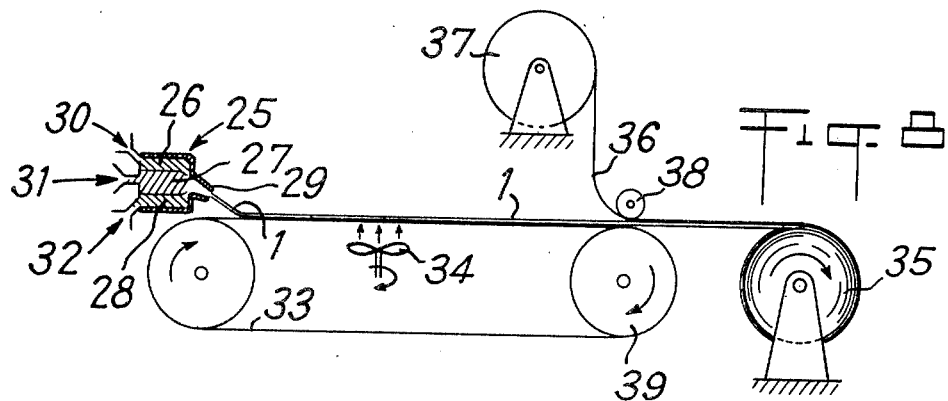
FIGS. 8 and 9 again show diagrammatically other installations for the manufacture of a composite strip.

The thermoplastic constituent materials and, if need be, the constituent material of the intermediate film, may be injected in paste or liquid form into a passage chamber 25 in such a manner that the said constituent materials are superimposed therein as layers 26, 27 and 28 and completely fill the said chamber 25, and then the individual strips and, if need be, the intermediate film, are co-extruded through a single extrusion nozzle 29, connecting the said passage chamber 25 with the outside in such a manner that the individual strips and, if need be, the said intermediate film, already adhere together when they leave the said extrusion nozzle 29. In FIG. 8 this method of production has been diagrammatically represented. In particular, a diagrammatic representation has been given of the extruders of the various individual strips and of the intermediate film by means of arrows 30, 31 and 32, said extruders communicating with the rear of passage chamber 25. At the output end of the extrusion nozzle 29, the composite strip is deposited on an endless conveyor band 33 which may be cooled by a cooling system 34. The composite strip 1 is wound on a reel 35 after leaving the top strand of the conveyor band 33. It is also possible to apply on the external face of at least one of the individual strips, that is to say on the external face of the composite strip 1, a reinforcement strip 36 of cardboard, expanded synthetic material or any other similar material, so as to effect a firm and unglueable join between the said individual strip, that is to say the composite strip and the said reinforcing strip 36. For the purpose it is possible to use a reel 37 from which the reinforcing strip 36 is taken, and it is made to pass between a pressing roller 38 and the return roll 39 of the endless band 33 conveying the composite strip 1.

Figure 9:
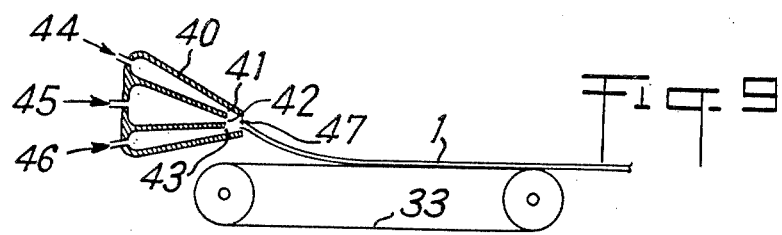

Instead of a passage chamber 25 opening out into a single extrusion nozzle 29, it is also possible to use a so-called extrusion nozzle 40 which has several individual extrusion nozzles 41, 42 and 43 each supplied by an extruder diagrammatically represented on FIG. 9 by arrows 44, 45 and 46 and opening out at the outer end into a common extrusion nozzle 47 from which the composite strip 1 is extruded, formed of two individual layers 2 and 3, and of the intermediate film 4. Naturally, there again the composite strip 1 may be provisionally held and supported by an endless conveyor band 33.

It is also possible to dispose on a first individual strip which may originate directly from the extrusion and being at sterilisation temperature a thin strip of light metal or metal alloy coated on the face intended to be applied against the first individual strip with a thin coating of thermoglueing material, the said thin strip having been sterilised previously to its deposition onto said first strip. In certain cases, it is advantageous to use as second individual strip a protection sheet which may be easily unstuck from the first individual strip.

On FIGS. 10 to 16 a representation has been given of an application of the composite strip described above to the sterile packing of products. This products to be packed are preferably in paste and/or liquid form, but they may also be solid and constituted by powder or loose materials, or in small pieces. As already mentioned, the composite strip lends itself particularly well to the making of containers or sachets whose internal wall is sterile and which contains one of the also sterile products.

Figure 10:
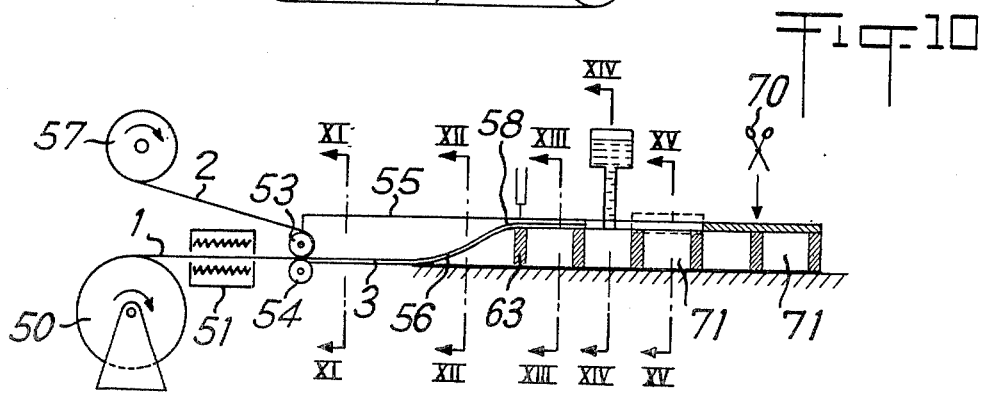
FIG. 10 shows diagrammatically an installation permitting the application of the composite strip according to the invention to the sterile packing of products.
Figure 11:
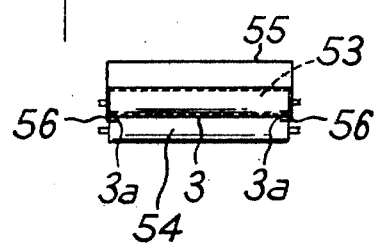
FIGS. 11 to 15 show diagrammatic vertical sections through the installation of FIG. 10 along lines XI—XI, XII—XII, XIII—XIII, XIV—XIV and XV—XV.
Figure 12:
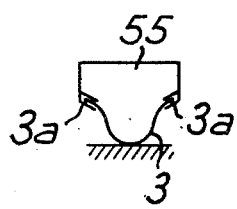
Figure 13:
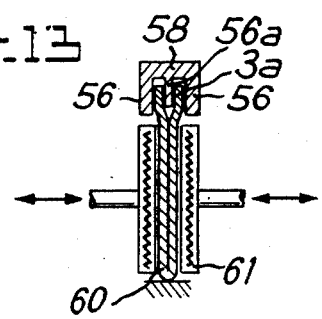
Figure 14:
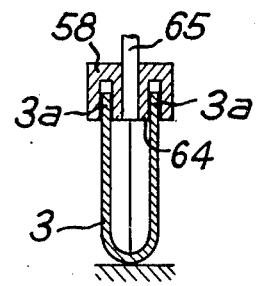
Figure 15:
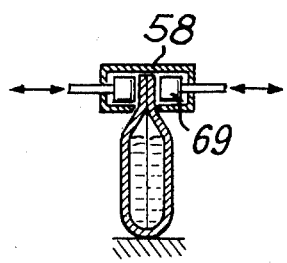
Figure 16:
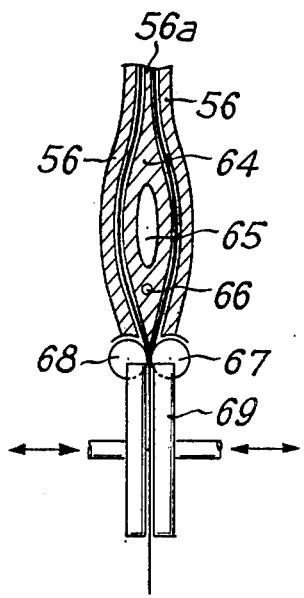
FIG. 16 is a plan view of a diagrammatic horizontal section along line XVI—XVI of FIG. 14.

As may be seen on FIG. 10, the composite strip 1 is unwound from a reel 50 and passes, if need be, into a heating box 51 where it is heated to a temperature promoting the separation of the individual strips 2 and 3. After having been heated, the composite strip passes between the rolls of a pair of rolls 53 and 54 the upper roll 53 of which is entirely covered, and the bottom roll of which is partly covered by an enclosure 55 which is kept liquid-tight and which is sterile. The bottom portion of this sterile enclosure 55 is delimited by the individual strip 3 whose side edges are guided in sealed manner in guides 56 solid with the rigid wall of the enclosure 55. The second individual strip 2 is wound, to the order of 180°, on the upper roll 53 and leaves immediately afterwards in sealed manner the sterile enclosure 55 to be wound as a reel 57. It is to be noted that the separation of the individual strips 2 and 3 is effected at the level of the pair of rolls 53 and 54 and that these strips have solely their sterile inner faces towards the inside enclosure and partly participate in the delimitation of the said sterile enclosure 55.

At the time of the introduction into the sterile enclosure, the composite strip 1 and the individual strips 2 and 3 are placed flat. But as the individual strip 3 advances in the sterile enclosure, its longitudinal edges 3a are brought closer to each other with the aid of the lateral guides 56 which also come closer (see FIGS. 11 and 12). The bringing closer together of the side edges 3a is continued until the two edges 3a occupy a vertical position adjacently to each other, and are separated only by an intermediate slide 56a of the guides 56. At the same time, the sterile chamber 55, or more precisely the rigid portion of the sterile chamber narrows down and reduces progressively in such a manner as to be nothing more than a double guiding edge 58 with the two guides 56. The flat individual strip has thus been converted into a flattened tube 60 which is sealed transversally to its longitudinal edges with the aid of a sealing tool, by a hot process, 61, in order to make tubular packing sections or elements. The transversal sealing areas are shown on FIG. 10 by means of the reference 63. In this way, a succession of sachets have been made which are still open laterally, but which are covered in sealed manner by the guiding slide 58. After the execution of the welding or transversal sealing 63, the intermediate slide 56a (FIG. 13) widens as a nose cone 64 (see FIGS. 14 and 16) so as to move the lateral edges 3a apart and to form a filling opening. The separation nose cone 64 has a supply duct 65 preferably of flattened shape and, if need be also, a tube 66 connected to a sterile atmosphere enclosure to make it possible not only to keep up a sterile atmosphere inside the sachet or tubular packing element 60, but also to effect seal-tightness between the longitudinal edges 3a of the strip 3 and the guiding slides 56. On leaving the separation nose cone 64, the side edges 3a are introduced into the slit existing between a pair of pressing rollers 67, 68 which already provisionally close at least the introduction opening and which apply the said longitudinal edges 3a one against the other in seal-tight manner. Then, the two edges are again sealed together with the aid of the sealing station according to 69. This sealing station 69 is always disposed inside the guiding slide 58. Finally, the filled sachet, fully sealed in tight manner on three of its sides is then cut in the area of transversal sealing 63 with the aid of a cutting device diagrammatically represented in FIG. 10 by means of reference 70.

By means of the installation previously described it is therefore possible to apply the composite strip to the manufacture of sterile packs of products in paste, liquid or solid form. In this application, progression is preferably step by step, for the composite strip 1, and, if need be, the strip is heated to a temperature promoting the separation of the composite strip 1 into two individual strips. The two individual strips are separated from each other in a sterile enclosure 55 delimited partly by the said individual strips 2 and 3. The non-sterile side of each individual strip is situated, in this case, outside the sterile enclosure 55. In seal-tight manner one of the individual strips, for example strip 2, is evacuated out of the said enclosure 55 while the guiding is made in seal-tight manner of the longitudinal sides 3a of the other individual strip 3 along the rigid wall of the said enclosure 55 in such a manner as to bring together progressively the sterile faces of the longitudinal sides and thus form a tube preferably flattened. The elongated transversal areas of the internal face of the said tube are joined together by tight transversal sealing 63, preferably, under pressure and with the application of heat in such a manner as to form sections of tubes or tubular packing elements 71 closed in seal-tight manner on the outline of the said tube sections with the exception of the longitudinal edges 3a of the said tube. Then the two longitudinal edges 3a are pulled apart, still inside the sterile enclosure 55 which now is reduced to the guiding slide 58 in such a manner as to make at the place of a tube section 71 a lateral insertion opening. This lateral insertion opening is made with the aid of the separation nose cone 64. The product is introduced through the said insertion opening by means of a filling tube 65 and, finally, the said insertion opening is closed in seal-tight manner by sealing one on top of the other the sections of the corresponding longitudinal sides 3a. Thus, a chain of sterile sachets or packing containers has been made, filled with a sterile product. Once hermetically sealed, the various tube sections or tubular packing elements, filled and closed 71, leave the sterile enclosure 55 and its extension constituted by the guiding slide 58. It is then possible to separate the portions of tubes or tubular packing elements 71 by cutting them one from the other at the transversal sealing areas 63 by means of a suitable device 70.

According to another method of embodiment of the application of the composite strip to the sterile packing of products, it is possible to close the tubes made from the individual strip 3 along its longitudinal edges by sealing one on the other the said longitudinal edges 3a as the said individual strip 3 moves forward, and thus the composite strip 1. Once they are sealed longitudinally, it is possible to seal transversally the said tubes at a place away from the sterile enclosure 55 in such a manner as to seal in tight manner the passage between two successive sections of the tube. Then the filling is made from the sterile enclosure of the tube sections which, preferably, then occupy a vertical position and which communicate with the said enclosure 55. Once the tube section has been filled with a certain amount of product and the said tube has been lowered by one progression step, the said tube is again sealed or welded transversally at the other end of the tube section which has just been filled. Thus, there are made in succession tubular packing elements with sterile internal wall and having a sterile product. It is then possible to separate the various sections of filled tubes by cutting them off transversally in the areas of their transversal sealings. It is important, in this case, for the two side edges of the strip 3a to be guided in seal-tight manner in the guides 56 until the internal faces of the longitudinal edges 3a are welded in seal-tight manner together. Thus, the enclosure 55 communicates only with the sterile interior of the tube which has just been formed and it is possible to guarantee the sterility of the internal wall of the tube and of the tubular packings as long as the enclosure is sterile and the filling of the tubular elements does not introduce any pollution.

Instead of assembling the two side edges of a single individual strip so as to form sterile tubular packings, it is also possible to operate in a different fashion to obtain sterile packings. According to an alternative, the composite strip 1 is moved forward step by step and it is heated to a temperature promoting the separation of the two individual strips 2 and 3. Then, the two individual strips 2 and 3 are separated between two sterile guiding side walls and the longitudinal edges of the composite strip are guided in seal-tight manner and, after separation, the longitudinal edges of the individual strips 2 and 3 are guided along and between the said rigid guiding side walls in such a manner as to make, with the said guiding walls, the sterile internal surfaces of the individual strips, a sterile seal-tight filling area.

Then, the central portions of the individual strips 2 and 3 are kept away each from the other, while bringing closer the corresponding longitudinal edges 2a and 3a of the two individual strips 2 and 3. The tight-sealing is performed of each of the two edges 2a or 3a of one of the individual strips 2 and 3 on the corresponding edge 2a or 3a of the other individual strip over a length at least equal to a forward movement step of the composite strip 1 in such a manner as to obtain lateral sealing sections and a tubular packing element. The tight-sealing is performed, between two successive forward movement steps, of the two individual strips 2 and 3 over their entire width along a plane perpendicular or transversal to their longitudinal edges 2a and 3a with a view to sealing in tight manner the so-called bottom end of the tubular packing element, the transversal sealing area of the two individual strips beng situated astride between two successive tubular packing elements. Then, the tubular packing element in communication with the sterile enclosure is filled with a predetermined amount of the product from the sterile enclosure 55 and the said individual strips and the tubular elements are moved forward one step. Finally, the other filling end of the filled tubular element is sealed transversally, while filling at the same time the so-called bottom end of the next tubular element. The bottom end of the next tubular element obviously merges with the filling end of the preceding adjoining tubular element. Finally, and only if need be, the tubular packing elements are separated by cutting them apart at the transversal sealing areas.

Advantageously, the filling of the tubular elements is carried out with at least one duct entering in seal-tight manner the sterile enclosure 55 through one of the rigid lateral walls of the said sterile enslosure. In addition, it is advantageous to introduce a sterile gas in the sterile enclosure 55 through one of the rigid guiding walls.

As may be seen on FIGS. 17 to 20, use is made, according to a first method of application, of two composite strips 101 and 102 which are each unwound from a storage reel 103 and 104 before being introduced in opposite directions each into a sterile enclosure described as a guiding enclosure 105 and 106 extending, in the particular case, horizontally. At the inlet to this guiding enclosure 105, 106, there are disposed a pair of return rollers 107, 108 and 109 and 110. At the place of these pairs of return rollers 107, 108 and 109, 110, each composite strip is divided into two individual strips 101a and 101b or 102a and 102b. The separation of the composite strip into two individual strips is performed in such a manner that the sterile face of each individual strip seals in tight manner the entry into the guiding sterile enclosure 105 or 106. In other words, it is only the sterile side of the individual strips that enters the sterile enclosure. The first individual strip 101a or 102a is guided by its edges into guiding slides 111. This guiding is performed in seal-tight manner relative to the outside surroundings as a result of the fact that, into the guiding sterile enclosure delimited on the one hand by the upper rigid wall 112 and the guide slides 111 and, on the other hand, by the individual strip 101a whose sterile face is turned towards the horizontal rigid wall 112, a sterile gas at a pressure slightly above the external medium is injected. Thus, there is permanently a small leak of sterile gas towards the outside, but there is no possibility of polluted atmosphere entering the sterile area.

The second individual strip 101b or 102b is returned, after having passed over the return roll 107 or 109, onto a storage reel 113 or 114.

From the side opposite the return rollers 107 and 108 or 109 and 110, the sterile guide enclosure 105 or 106 opens out into the upper part of the sterile enclosure known as filling enclosure 115. The upper horizontal wall of this filling enclosure 115 is constituted by the joining portion of the rigid wall 112 forming the top horizontal wall of the guiding enclosures 105 and 106. The filling enclosure 115 comprises two rigid lateral walls 116 and 117 joined at the top by the horizontal wall 112. Said lateral walls are disposed slantwise in such a manner as to come downwards nearer the vertical axis of the sterile enclosure 115. At their edges, the lateral walls 116 and 117 bear guiding slides for the edges of the first individual strips 101a and 102a. These guiding slides 118 and 119 are designed in such a manner as to support adequately the individual strips 101a and 102a with a view to preventing the slight excess pressure prevailing inside the sterile enclosure 115 from being able to remove them from their corresponding guiding slides. Moreover, the first individual strips 101a and 102a pass at the mouth of the guide enclosures 105, and 106 into the filling enclosure 115, over guide rolls 120 and 121 supporting the individual strips 101a and 102a on the non-sterile external side.

The first individual strips 101a and 102a are made to move downwards into the sterile filling enclosure 115 so as to bring together the edges of a strip to the edges of the other individual strip, forming a seal-tight tube, preferably flattened on the edges and communicating with the said filling enclosure 115. This flattened tube 122 is supplied with a packing product through a filling tube 123 entering downwards the sterile enclosure 115. The sterile gases are also brought into the filling enclosure 115 through ducts 124 whose mouths are directed towards the guiding enclosures 105 and 106.

At the bottom portion of the sterile filling enclosure 115, the guiding slides 118 or 119 unite into a single guiding slide 125 or 126 whose dimensions are such that the two juxtaposed edges of the two individual strips are applied one on the other in seal-tight manner. At the output of this filling area 115 there are provided at least one pair of pressure and seaing rolls 127 and 128 effecting the tight-sealing of the edges of the individual strips 101a and 102a. Below these pressure and sealing rolls which are situated only facing the longitudinal sides of the individual strips or, more precisely, of the formed tube 122, provision is made for a sealing device 129 which effects a transversal sealing of the internal faces of the individual strips in such a manner as to form a bottom end or a top closing end for a tubular packing element. Still below this transversal sealing device and at a distance equal to the length of a tubular packing element there is disposed a cutting device 130 permitting the separation of the succession of the tubular packing elements into individual packing elements.

The installation represented on FIGS. 21 and 22 differs from that of FIGS. 17 to 20 in that it does not have a sterile guiding enclosure and in that, accordingly, each composite strip 101 and 102 is separated into two individual strips 101a and 101b or 102a and 102b directly to one of the two opposite top inlets of the sterile filling enclosure 115. At the top of the filling enclosure 115 provision is made, for each composite strip 101 and 102, for a return roll 120 or 121 extending horizontally over the entire width of the corresponding composite strips.

As may be seen on FIGS. 21 and 22, the sterile faces of the two second individual strips 101b and 102b act as horizontal top walls for the sterile enclosure 115 and join in the vertical centre plane of the enclosure 115 passing through a pair of return rolls 131 effecting the seal-tight delivery of the two individual strips 101b and 102b.

According to a peculiarity of this method of construction the two individual strips 101b and 102b are applied one on the other by their sterile surface before they leave the sterile enclosure 115 in such a manner that we obtain, at the output of the rolls 131, a new composite strip 132 which, after its winding as a reel 133, may be reused subsequently as a composite strip.

The sterile filling enclosure 115 comprises, as in the case of the method of embodiment represented in FIGS. 17 to 20, two rigid lateral walls slanting downwards towards the central vertical axis of the enclosure 115. The rigid lateral walls 116 and 117 have at their top end a horizontal guiding slide 134 for the edges of the second individual strips 101b and 102b whose sterile face is turned towards the inside of the sterile filling enclosure 115. As in the previous example, the rigid lateral walls 116 and 117 present, on their slanting edges, guiding slides 118 and 119 for the edges of the first individual strips 101a and 102a. In addition, the rigid lateral walls 116 and 117 are passed through by supply ducts 123 for the product and for the sterile gas 124.

It is understood that when mention is made of a seal-tight sterile enclosure, slight leaks of sterile gas are ignored and this seal-tightness is considered solely relative to the outside polluted surroundings when standing inside the sterile enclosure 115. At the bottom end of the sterile enclosure 115 and outside it, provision is made for pairs of rolls or pressing rollers 127 and 128 which bring the edges of the first two individual first strips 101a and 102a one against the other and join them together with the aid of a seal-tight coating while allowing a flattened tube 122 to subsist which was formed inside the seal-tight enclosure 115 as the two individual strips 101a and 102a move downwards. When a mention is made of the seal-tightness of the tubular elements, this refers to absolute seal-tightness preventing any passage of gas or liquid from outside inwards and from inside outwards.

According to the method of construction represented on FIGS. 23 and 24, use is made as top cover wall of the sterile filling enclosure 115 of part of the second individual strips 101b and 102b. The essential difference of this method of construction as compared with the foregoing method of construction represented on FIGS. 17 to 22 lies in the fact that the composite strips 101 and 102 enter directly the filling enclosure 115, each passing between a pair of return rolls 135 and 136 and 137 and 138, the second roll 136 or 138 of each pair of return rolls constituting at the same time the pair of delivery rolls between which the two second individual strips 101b and 102b pass, and are impelled in seal-tight manner one on the other at the time of this passage, in such a manner as to constitute a new composite strip 132 which may be wound into a reel 133 before being reused. It will be noticed that in this case also, the sterile filling enclosure 115 has rigid lateral walls 116 and 117 sloping downwards towards the vertical central axis of the enclosure 115 and provided on the edges with guide slides 118 and 119 for the first individual strips 101a and 102a, the top end of these lateral walls being adapted to the cylindrical shape of the delivery rolls 136 and 138.

According to the method of construction represented in FIGS. 25 to 27, the composite strips 101 and 102 are brought in the folded state so that their cross-section has the shape of a parabola. The composite strips 101 and 102 are introduced in this state into the sterile enclosure 115 which is delimited, on the one hand, by the sterile faces of the four individual strips 101a, 102a, 101b and 102b originating from the separation of each composite strip into two individual strips. In addition, the sterile enclosure 115 is delimited laterally by two rigid lateral walls 139 and 140 whose special outline is adapted to the pairs of return rolls which also form part of the sterile enclosure.

The installation such as represented on the figures 25 to 27 comprises at the two opposite horizontal inlets and at the two opposite vertical outlets of the sterile enclosure 115 two pairs of superimposed return rolls 141 and 142 and 143 and 144. Each pair of rolls 141, 142, and 143, 144 comprises an upper roll with a horizontal axis (142 and 144) whose radial section displays a parabolic generatrix in relief and a bottom roll with a horizontal axis (141 or 143) whose radial section displays a generatrix of follow parabolic shape. At the two ends, each roll comprises a circular cylindrical part 141a, 142a, 143a, 144a. In addition, the parabolic radial sections of the rolls have a shape such that the parabolic outline of revolution in relief of the upper roll of a pair of rolls conforms perfectly to the hollow parabolic outline of the bottom roll of the same pair of rolls 141, 142, for example. The pairs of rolls are disposed in such a manner that the rolls of the same pair are also in contact one with the other on the cylindrical external portion, for example 141a and 142a, that the bottom roll of a pair, for example the bottom roll 141, is in contact, by its extreme cylindrical portions 141a, with the corresponding extreme cylindrical portions of the bottom roll 143 of the other pair of rolls. In addition, the central portions of the top rolls 142 and 144 come closer each to the other at the level of the plane passing through their horizontal axes. In this way, the sterile enclosure 115 is delimited, on the one hand, by the lateral walls 139 and 140 whose outline is adapted to the cylindrical shape of the cylindrical extremities of the rolls 141 to 144 and by two horizontal metal sheets 145 situated at the level of the horizontal axes of the top rolls 142 and 144 and between the outline of these rolls with parabolic relief and, on the other hand, by the sterile internal faces of the individual strips 101a, 102a and 101b and 102b, resting on the hollow parabolic or relief parabolic outlines of the rolls 141 and 144. In this way, there is made between the two bottom rolls 141 and 143 a sterile enclosure 115 whose shape corresponds to that of a flattened tube and the first two individual strips 101a and 102a assume this flattened tube shape immediately and are joined along their edges in such a manner as to constitute tubular flattened elements which may be sealed directly with the aid of the cylindrical portions 141a and 143a of the rolls 141 and 143 or subsequently by the sealing rollers or bearings 127 and 128. In the said enclosure 115, a supply tube 123 is brought which passes in seal-tight manner the rigid side wall 140 of the enclosure 115. In addition, this rigid lateral wall 140 is also provided with sterile gas supply ducts 124.

Figure 28:
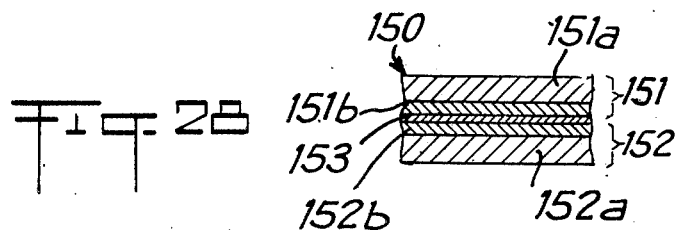
FIG. 28 is a cross-section of a composite strip having a separation intermediate layer or film.

On FIG. 28 a representation has been given of a composite strip 150 which comprises between the individual strips 151 and 152 an intermediate separation coating or film 153, each individual strip 151 and 152 being composed of an external strip 151a or 152a, for example of cardboard, and a bottom strip 151b or 152b, for example in a thermoplastic material, the external strip and the internal strip of each individual strip adhering intimately together.

Figure 29:
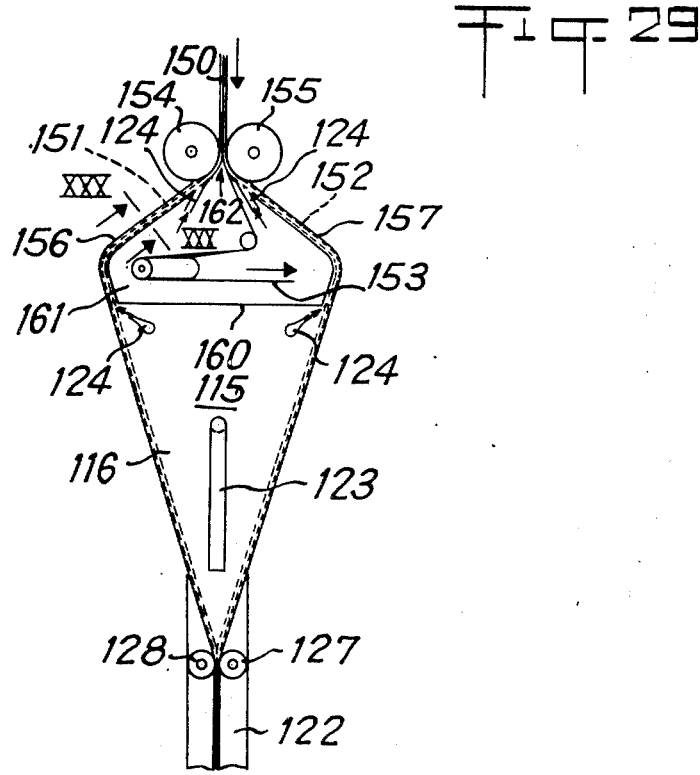
FIG. 29 is a diagrammatic elevation view of a sterile packing installation employing a composite strip according to FIG. 28.
Figure 30:
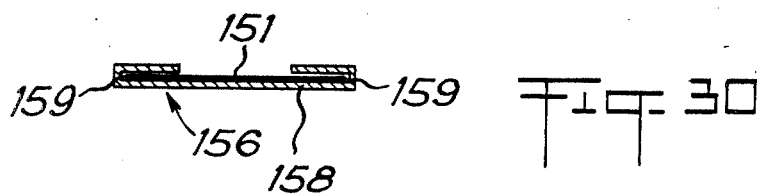
FIG. 30 is a view of a cross-section of a sterile guiding enclosure along line XXX—XXX of FIG. 29.

When use is made of a single composite strip having two individual strips 151 and 152 separated from each other by an intermediate film 153, and when it is desired to use the individual strips 151 and 152 to make seal-tight packings whose internal wall is sterile, it is advantageous to use an installation such as represented on FIGS. 29 and 30.

The composite strip 150 first of all passes downwards between two return rolls with a horizontal axis 154 and 155 before being separated into two individual strips 151 and 152 and an intermediate film 153. Each individual strip 151 and 152 enters from the moment of its separation a sterile guiding enclosure 156 and 157. Each guiding enclosure 156 and 157 comprises a bottom metal sheet 158 covering the sterile face of the individual strip 151 or 152 and having at each of its edges a guiding slide 159 whose upper wing partly covers the non-sterile external face of the individual strip 151 or 152. The input of this sterile guide enclosure 156 or 157 is disposed in the immediate vicinity of the corresponding return roll 154 or 155 and has sterile gas supply ducts permitting sending to the input of the guide enclosure a sterile gas preventing the polluted ambient atmosphere from coming in contact with the sterile faces of the individual strips 151 and 152 at the time of their separation.

As may be seen in FIG. 29, the two guiding enclosures 156 and 157 extend downwards and outwards from the return rolls 154 and 155 and then curve slightly in such a manner as to exhibit a relatively small slanting relative to the vertical, and to converge towards the vertical plane defined by the composite strip 150. The bottom end of each guiding enclosure 156 or 157 then opens out into the sterile enclosure called filling enclosure 115 which is constituted in a manner similar to the enclosure 115 of FIGS. 17 to 20. The bottom end of each guiding enclosure 156 or 157 is connected with the bottom end of the other guiding enclosure by a horizontal metal sheet 160 which constitutes, on the one hand, the horizontal top wall of the filling enclosure 115 and, on the other hand, the bottom of a kind of transversal tunnel also delimited by the walls of the sterile guiding enclosures 156 and 157.

This transversal tunnel 161 is open at its top end by an inlet slit 162 through which the intermediate film 153 passes. In this transversal tunnel 161 at least two return rolls are disposed whose axes intersect in such a manner that the intermediate film 153 may be evacuated transversally from the tunnel 161 before being wound on a reel which has not been represented. The sterile filling enclosure 115 is designed in the same way as that represented in FIGS. 17 to 20, except for the fact that the supply duct 123 and the sterile gas supply ducts 124 enter the enclosure not from above but through lateral walls 116 or 117 whose top ends are solid with the horizontal wall 160. There also a part of the walls of the sterile filling enclosure 115 is formed by individual strips 151 and 152 which, at the bottom end of said filling enclosure, are brought closer to each other by their edges so as to form a flattened tube. The edges of this flattened tube are sealed one on the other so as to form a tubular element 122 which is seal-tight on its edges and which, at its top end, communicates with the inside of the sterile filling enclosure. The sealing of the edges of the individual strips is made by rollers or pressing rolls 127 and 128 and, subsequently, the tubular element 122 receives a transversal welding through the device 129 and, again subsequently, it may be cut off at the place of the transversal welding. Thanks to these various methods of construction of the packing installations it is possible to apply the composite strip such as described in the principal patent to the production of sterile packings for products.

According to the present invention use is made in particular of two composite strips, for example 101 and 102, at least one of which comprises an individual strip made of a thermoplastic material or which at least is provided with such a material on its sterile internal face. Then each composite strip 101 and 102 is brought either directly towards the same sterile filling enclosure 115, or indirectly through a sterile enclosure denoted as a guiding enclosure, for example 105 or 106, in such a manner that the sterile face of the individual strip is directed towards the inside of said enclosure and is able to come facing the sterile face of the other individual strip corresponding thereto of the other composite strip. When two sterile guiding enclosures are used, each composite strip, which may be heated beforehand to a temperature promoting its separation, is separated into a first and a second individual strip, for example 101a and 101b at the corresponding input of the sterile guiding enclosure. If this separation is performed without having recourse to a sterile guiding enclosure, this separation is made at the input of the sterile filling enclosure in such a way that each individual strip of each composite strip 101 and 102 delimits by means of its sterile face at least part of the corresponding input of the sterile enclosure. Then, the guiding is performed in seal-tight manner relative to the ambient atmosphere and with the prevailing of a slight excess pressure due to the sterile gas sent into the sterile enclosure, of the edges of the first individual strip, for example 101a and 102a of each composite strip 101 and 102 between the rigid lateral walls (guiding slides 118 and 119) of the filling enclosure 115 in such a manner as to bring them closer to the edges of the other first individual strip forming a seal-tight tube 122 preferably flattened on the edges and communicating with the sterile 115 by its top end. During this period, the removal is still performed in seal-tight manner out of the sterile filling enclosure or, if use is made of guiding enclosures, out of said sterile guiding enclosure, of the second individual strips, for example 101b and 102b. At the same time, the corresponding edges of the first individual strips 101a and 102a are sealed together, either continuously or stepwise, and the first two strips are sealed one on top of the other along an area that is transversal or perpendicular to the edges of said first strips, in such a manner as to form two tube sections or successive tubular packing elements. The section or packing element communicating with the sterile filling enclosure is filled from said enclosure with the aid of a supply tube 123 entering said enclosure 115, and then the individual strips and the tubular elements are moved forward by a length corresponding to that of a tubular element before sealing transversally the first individual strips of the tubular element which has just been filled in such a manner as to close it and to make the transversal bottom end of the next tubular element. After a supplementary move forward along a length equal to a tubular element, the filled and closed elements may be cut in the transversal sealing area. As will be seen more particularly in FIGS. 21 and 23, it is possible, before removing the second individual strips 101b and 102b outside the sterile filling enclosure 115, to guide the edges of said second individual strips in seal-tight manner between the rigid lateral walls of the filling enclosure in such a manner as to form with said second individual strips a portion of wall, that is to say a portion of the top wall of said filling enclosure 115.

In certain cases it may also be advantageous to bring together the sterile faces of the second individual strips at the delivery of the sterile filling enclosure 115 and to seal them one against the other in seal-tight manner at least on their corresponding edges so as to form a new composite strip having two individual strips whose faces turned one towards the other are sterile. This method of construction is represented more particularly in FIGS. 21 and 23 where the new composite strip 132 may be re-used after having been wound as a reel 133 in place of a starting reel 103 or 104. As may be seen more particularly in FIGS. 23, 25 and 26, it is possible to use the second individual strips in such a manner as to make them form part of the walls of the sterile filling enclosure, giving them the partial shape of a body of revolution, either cylindrical or parabolic. When it is desired to obtain a sterile filling enclosure of very small size, it is advantageous to bend each composite strip before it enters the sterile filling area, transversally, in such a manner that its cross-section exhibits at least approximately the shape of a parabola and to separate each composite strip inside the said enclosure into two individual strips while retaining for each individual strip a parabola-shaped section. Then, the edges of each first individual strip are brought close to each other and they are sealed one on the other before removing them in seal-tight manner from said enclosure. As the individual strips already possess a parabolic cross-sectional shape, a flattened tube is thus made by joining the individual strips. Opposite said flattened tube 122 the removal is effected out of the enclosure 115, also in seal-tight manner, of the second individual strips 101b and 102b, the edges of one of these second strips, for example 101b, being away from the edges of the other second strip.

In certain cases, it may be advantageous to remove the second individual strips out of the corresponding sterile guiding enclosure, by causing them to pass inside the space delimited by the two guiding enclosures and part of the first individual strips. In this case, the two guiding enclosure delimite a kind of transversal tunnel such as represented, for example, in FIG. 29.

When use is made of a composite strip having between two individual strips a separation layer or film, for example 153, it is possible to separate each individual strip 151 and 152 of the separation film 153 at the input of a corresponding guiding enclosure 156 or 157 provided for each of the individual strips 151 and 152. The separation of the composite strip into several individual strips is effected at the juxtaposed inlets of the two guiding enclosures in such a manner that the sterile face of each individual strip 151 or 152 is situated inside a corresponding guiding enclosure 156 or 157 and the separation film 153 is discharged into a space partly delimited by the two guiding enclosures. The two guiding enclosures 156 and 157 are shaped in such a way that the two individual strips first diverge and then converge, and that finally the edges of each of the two individual strips are brought close to those of the other individual strip in a sterile filling enclosure 115 into which the two guiding enclosures open out. The following operations are therefore similar to those already described in connection with the preceding FIGS. 17 to 24.

Naturally, the various methods of embodiment and application have been given only for the sake of example. The scope of the present invention is not limited to these examples, but, on the contrary, it is determined by the attached claims.

What is claimed is:

1. A composite packaging laminate which is internally sterile and which is intended for the sterile packing of products, preferably in liquid and/or paste form, but which is without such products therein, said composite packaging laminate comprising at least two individual strips, one of which comprises a thermoplastic material, said strips being adhered together in a sealing manner at least at their edges whereby the adjacent surfaces of the strips lie in opposed, facing relationship, said adjacent surfaces being sterile and having been sterilised by the time they are adhered together, said adjacent surfaces also being readily separable each from the other under the action of pulling forces applied to the individual strips in divergent directions at a temperature which is at most equal to the softening temperature of the thermoplastic material, the thermoplastic material being such that after the separation of the two individual strips, the said one strip can be heat sealed to part of itself or to another individual strip with the application of heat and pressure to the thermoplastic material.

2. A composite laminate according to claim 1, wherein the said one strip consists wholly of a thermoplastic material.

3. A composite laminate according to claim 1, wherein the said one strip includes a thermoplastic material.

4. A composite laminate according to claim 1, wherein the said other strip comprises a cellulose material.

5. A composite laminate according to claim 1, wherein the said other strip comprises a metallic material.

6. A composite laminate according to claim 1, wherein one of the individual strips has an adequate thickness to permit heat-forming by deep stamping.

7. A composite laminate according to claim 1, wherein the said one strip comprises an expanded material.

8. A composite laminate according to claim 1, wherein at least one of the said individual strips is itself constituted by several superimposed strips which are not easily separable one from the other.

9. A composite laminate according to claim 1 wherein said strips are also adhered together throughout the width and length of said adjacent faces.

10. A composite laminate according to claim 1, further comprising a thin sterile separation layer interposed between the two individual strips and adhesively secured to at least one of said strips.

11. A composite laminate according to claim 10, wherein the separation layer exhibits, relative to one of the individual strips, an adhesive power greater than that relative to the other strip.

12. A composite laminate according to claim 10, wherein the separation layer is based on silicones.

13. A composite laminate according to claim 10, wherein the separation layer is based on a therma-adhesive glue.

14. A composite laminate according to claim 9 wherein the separation layer is based on a microcrystalline wax.

15. A composite laminate according to claim 1, wherein the said other individual strip comprises a thermoplastic material.

16. A composite laminate according to claim 15, wherein the nature of the thermoplastic material of the said other individual strip is different from that of the thermoplastic material of the said one individual strip.

17. A composite laminate according to claim 15, wherein the two individual strips comprise the same thermoplastic material.

18. A composite laminate according to claim 15, wherein the thicknesses of the two individual strips are different and one of said strips has a thickness at least twice than that of the other individual strip and is such as to permit heat-forming by deep stamping.

* * * * *